Patented Mar. 16, 1937

2,073,619

UNITED STATES PATENT OFFICE 2,073,619

PROCESS OF PRODUCING TRANSFORMATION PRODUCTS OF ACRYLIC ACID OR ITS DERIVATIVES

Walter Bauer and Adolf Gerlach, Darmstadt, Germany, assignors, by mesne assignments, to Röhm & Haas Company, Philadelphia, Pa., a corporation of Delaware No Drawing. Application December 19, 1928, Serial No. 327,173. Renewed March 20, 1934. In Germany January 24, 1928

8 Claims. (Cl. 260—2)

Our invention consists in a new process of making polymerization products of acrylic acid and acrylic acid derivatives containing the following characteristic nuclear structure

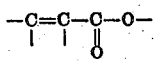

We have discovered that technically useful polymerization products of acrylic acid and acrylic acid derivatives containing the following characteristic nuclear structure

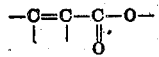

can be made by said compounds being treated with gaseous oxygen. By the application of heat or pressure, or both, the reaction is expedited. In the place of oxygen, also oxygen containing gases, e. g. air, or substances, which under certain conditions will split off oxygen, e. g. organic superoxides, can be employed. The polymerization can be successfully performed with small amounts of the said substances. Also suitable supplemental agents can be added. For instance, we have found that the addition of organic solvents, e. g. acetone, or the like, is especially advantageous.

Example 100 kg. of acrylic acid ethyl ester are mixed with 100 kg. of acetone and in an iron vessel are heated to boiling temperature while continually oxygen is passed through the mixture. A solution of great viscosity is formed. After the heating has been continued for about twenty hours, the odor of the acrylic acid ethyl ester has completely disappeared. The resulting solution can be used for technical purposes. By the acetone being distilled off, a solid polymerization product of acrylic acid ethyl ester is obtained.

For instance, esters of acrylic acid, such as the ethyl ester may be used. Likewise the term "oxygen" as used herein, includes not only oxygen itself, but gases containing oxygen and substances adapted to split off oxygen.

We claim:—

1. In the manufacture of polymerization products from the ethyl ester of acrylic acid, the process which comprises mixing together approximately equal parts of said ethyl ester and acetone, heating the mixture to boiling and simultaneously passing a current of gaseous oxygen through the heated mixture until said polymerization is effected and then distilling off the acetone and recovering the solid polymerization product thus obtained.

2. In the manufacture of polymerization products from the ethyl ester of acrylic acid, the process which comprises mixing said ester with acetone, heating the mixture to boiling and passing a current of gaseous oxygen through the heated mixture until said polymerization is effected.

3. In the manufacture of polymerization products from the ethyl ester of acrylic acid, the process which comprises mixing said ester with an organic solvent, heating the mixture to boiling and passing a current of gaseous oxygen through the heated mixture until said polymerization is effected.

4. In the manufacture of polymerization products from an ester of acrylic acid the process which comprises mixing said ester with an organic solvent, heating the mixture to boiling, and passing a current of oxygen through the heated mixture until said polymerization is effected.

5. In the manufacture of polymerization products of an aliphatic ester of acrylic acid the step which comprises subjecting the ester to polymerizing influences in the presence of an organic peroxide.

6. The process which comprises polymerizing an ester of acrylic acid in the presence of oxygen.

7. The process which comprises polymerizing an ester of acrylic acid in the presence of an organic peroxide.

8. The process which comprises polymerizing an ester of acrylic acid in the presence of a substance which will split off oxygen in the reaction.

WALTER BAUER.
ADOLF GERLACH.